United States Patent
Li et al.

(10) Patent No.: US 12,041,607 B2
(45) Date of Patent: Jul. 16, 2024

(54) RESOURCE ALLOCATION METHOD AND APPARATUS, AND SYSTEM

(71) Applicant: Huawei Technologies Co., Ltd., Shenzhen (CN)

(72) Inventors: Xiaocui Li, Beijing (CN); Kai Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/898,720

(22) Filed: Aug. 30, 2022

(65) Prior Publication Data
US 2022/0417966 A1    Dec. 29, 2022

Related U.S. Application Data (63) Continuation of application No. 16/760,335, filed as application No. PCT/CN2018/112831 on Oct. 31, 2018, now Pat. No. 11,432,311.

(30) Foreign Application Priority Data

Nov. 1, 2017  (CN) .......................... 201711059522.9

(51) Int. Cl.
  *H04W 72/1268*  (2023.01)
  *H04L 1/1607*  (2023.01)
  (Continued)

(52) U.S. Cl.
  CPC ....... *H04W 72/1268* (2013.01); *H04L 1/1614* (2013.01); *H04W 72/0466* (2013.01);
  (Continued)

(58) Field of Classification Search
  None
  See application file for complete search history.

(56) References Cited

U.S. PATENT DOCUMENTS

| | | |
|---|---|---|
| 2014/0254544 A1 | 9/2014 | Kar Kin Au et al. |
| 2017/0150367 A1 | 5/2017 | Han et al. |

(Continued)

FOREIGN PATENT DOCUMENTS

| | | |
|---|---|---|
| CN | 105284172 A | 1/2016 |
| EP | 2898739 B1 | 9/2018 |

(Continued)

OTHER PUBLICATIONS

R1-1710887, Intel Corporation et al, "UL grant-free transmissions: Physical layer procedures," 3GPP TSG RAN WG1 NR Ad-Hoc#2, Qingdao, P.R. China, Jun. 27-30, 2017, 4 pages.

(Continued)

*Primary Examiner* — Alex Skripnikov
(74) *Attorney, Agent, or Firm* — Conley Rose, P.C.

(57) ABSTRACT

A resource allocation method includes sending, by a network device, first information to user equipment, where the first information is used to indicate uplink resources corresponding to autonomous uplink transmission performed by the user equipment; and sending, by the network device, second information to the user equipment, where the second information is used to indicate a resource that is in the uplink resources and that is actually used by the user equipment to perform autonomous uplink transmission. The uplink resources corresponding to autonomous uplink transmission are allocated while resource utilization is ensured.

28 Claims, 6 Drawing Sheets

(51) Int. Cl.
| | |
|---|---|
| *H04W 72/044* | (2023.01) |
| *H04W 72/23* | (2023.01) |
| *H04W 72/50* | (2023.01) |
| *H04W 76/11* | (2018.01) |
| *H04W 76/27* | (2018.01) |
| *H04W 80/02* | (2009.01) |

(52) U.S. Cl.
CPC ......... *H04W 72/23* (2023.01); *H04W 72/535* (2023.01); *H04W 76/11* (2018.02); *H04W 76/27* (2018.02); *H04W 80/02* (2013.01)

(56) References Cited

U.S. PATENT DOCUMENTS

| | | | |
|---|---|---|---|
| 2017/0230838 | A1 | 8/2017 | Yerramalli et al. |
| 2019/0098657 | A1 | 3/2019 | Golitschek Edler Von Elbwart et al. |
| 2019/0191416 | A1* | 6/2019 | Xie ........................ H04W 72/04 |
| 2020/0213901 | A1 | 7/2020 | Yoshimoto et al. |

FOREIGN PATENT DOCUMENTS

| | | |
|---|---|---|
| RU | 2604812 C2 | 12/2016 |
| WO | 2017099860 A1 | 6/2017 |
| WO | 2017132840 A1 | 8/2017 |

OTHER PUBLICATIONS

R1-1717261, Lg Electronics, "Resource allocation and control Signaling for autonomous UL access," 3GPP TSG RAN WG1 Meeting 90bis, Prague, CZ, Oct. 9-13, 2017, 5 pages.

R1-1717115, Huawei et al, "On resource allocation for AUL," 3GPP TSG RAN WGI Meeting #90bis Prague, Czech Republic, Oct. 9-13, 2017, 3 pages.

R1-1712942 Nokia et al., "Resource allocation for Autonomous UL Access", 3GPP TSG-RAN WG1 Meeting #90, Prague, Czech Republic, Aug. 21-25, 2017, 4 pages.

R1-1712478 Intel Corporation, "A framework to enable autonomous uplink access", 3GPP TSG RAN WG1 Meeting #90, Prague, P.R. Czechia Aug. 21-25, 2017, 4 pages.

R1-1713026 Qualcomm Incorporated, "Resource allocation for autonomous UL access", 3GPP TSG RAN WG1 #90, Prague, Czech, Aug. 21-25, 2017, 4 pages.

3GPP TS 36.331 V14.4.0, "3rd Generation Partnership Project; Technical Specification Group Radio Access Network; Evolved Universal Terrestrial Radio Access (E-UTRA); Radio Resource Control (RRC); Protocol specification (Release 14)", Sep. 2017, 753 pages.

3GPP TS 36.212 V14.4.0, "3rd Generation Partnership Project; Technical Specification Group Radio Access Network; Evolved Universal Terrestrial Radio Access (E-UTRA); Multiplexing and channel coding(Release 14)", Sep. 2017, 198 pages.

3GPP TS 36.213 V14.4.0, 3rd Generation Partnership Project; Technical Specification Group Radio Access Network; Evolved Universal Terrestrial Radio Access (E-UTRA); Physical layer procedures (Release 14), Sep. 2017, 461 pages.

XP051316322, R1-1713522, Samsung, "Resource allocation for autonomous UL access," 3GPP TSG RAN WG1 Meeting #90, Prague, Czechia, Aug. 21-25, 2017, 4 pages.

LG Electronics Inc., "Consideration on Type 1 resource control for NR," 3GPP TSG-RAN WG2 Meeting #99-Bis Prague, Czech Republic, Oct. 9-13, 2017, R2-1711579, 2 pages.

Intel Corp, "UL Grant-free transmissions: Resource configuration," 3GPP TSG RAN WG1 NR Ad-Hoc#2, Qingdao, P.R. China, Jun. 27-30, 2017, R1-1710568, 5 pages.

* cited by examiner

| 0 | 0 | 1 | 0 | 0 | 1 | 0 | 0 | 0 | 0 | 1 | 0 | 0 | 1 | 0 | 0 | 0 | 0 | 1 | 0 | 0 | 1 | 0 | 0 | 0 | 0 | 1 | 0 | 0 | 1 |

RESOURCE ALLOCATION METHOD AND
APPARATUS, AND SYSTEM

CROSS-REFERENCE TO RELATED APPLICATIONS

This is a continuation of U.S. patent application Ser. No. 16/760,335 filed on Apr. 29, 2020, which is a national stage of International Patent Application No. PCT/CN2018/112831 filed on Oct. 31, 2018, which claims priority to Chinese Patent Application No. 201711059522.9 filed on Nov. 1, 2017. All of the aforementioned patent applications are hereby incorporated by reference in their entireties.

TECHNICAL FIELD

This application relates to the field of communications technologies, and in particular, to a resource allocation method and apparatus, and a system.

BACKGROUND

Spectrums used in a wireless communications system may be classified into a licensed spectrum (licensed spectrum) and an unlicensed spectrum (unlicensed spectrum). The licensed spectrum can be used only by an operator that is licensed to use the licensed spectrum, and the unlicensed spectrum can be legally used by any person.

In the prior art, to meet increasing requirements for wireless communication, a licensed-assisted access (licensed assisted access, LAA) technology using the unlicensed spectrum in a long term evolution (long term evolution, LTE) network is proposed and is denoted as LTE LAA. Because the unlicensed spectrum can be legally used by any person, when transmitting uplink data by using the unlicensed spectrum, user equipment in LTE LAA needs to use a listen-before-talk (listen before talk, LBT) contention access mechanism. Therefore, when needing to transmit the uplink data by using the unlicensed spectrum, the user equipment in LTE LAA currently needs to first send a scheduling request to a base station, and then preempt, based on uplink scheduling information sent by the base station, a channel on corresponding unlicensed spectrum resources by using the LBT contention access mechanism. If successfully preempts the channel, the user equipment in LTE LAA transmits the uplink data on a corresponding unlicensed carrier. In order to improve autonomy of the user equipment in LTE LAA in transmitting the uplink data by using the unlicensed spectrum, an autonomous uplink (autonomous uplink, AUL) transmission technology is further proposed. Based on the autonomous uplink transmission technology, when sending the uplink data on the unlicensed spectrum, the user equipment does not need to send the scheduling request to the base station, and may directly send the uplink data after preempting the channel by using the LBT contention access mechanism on the unlicensed spectrum resources.

However, in the prior art, based on the autonomous uplink transmission technology, how to allocate uplink resources becomes an urgent problem to be resolved currently.

SUMMARY

This application provides a resource allocation method and apparatus, and a system, to resolve a prior-art urgent problem that how to allocate uplink resources according to an autonomous uplink transmission technology.

According to a first aspect, an embodiment of this application provides a resource allocation method, including: sending, by a network device, first information to user equipment, where the first information is used to indicate uplink resources corresponding to autonomous uplink transmission performed by the user equipment; and sending, by the network device, second information to the user equipment, where the second information is used to indicate a resource that is in the uplink resources and that is actually used by the user equipment to perform autonomous uplink transmission.

In an implementable design, the sending, by a network device, first information to user equipment includes: sending, by the network device, the first information to the user equipment by adding the first information to radio resource control signaling.

In an implementable design, the sending, by the network device, second information to the user equipment includes: sending, by the network device, downlink control information to the user equipment, where the downlink control information includes the second information; or sending, by the network device, the second information to the user equipment by adding the second information to a control unit at a media access control layer.

In an implementable design, the sending, by the network device, downlink control information to the user equipment includes: after the network device scrambles the downlink control information by using a specific radio network temporary identifier corresponding to autonomous uplink transmission, sending scrambled downlink control information to the user equipment.

In an implementable design, the first information includes one or more of the following information: start position information, end position information, a resource period, an offset of a start position, a first resource size, and pattern information of a first bitmap.

In an implementable design, the second information includes one or more of the following information: activation position information, deactivation position information, a second resource size, and pattern information of a second bitmap.

According to a second aspect, an embodiment of this application provides a resource allocation method, including: receiving, by user equipment, first information sent by a network device, where the first information is used to indicate uplink resources corresponding to autonomous uplink transmission performed by the user equipment; receiving, by the user equipment, second information sent by the network device, where the second information is used to indicate a resource that is in the uplink resources and that is actually used by the user equipment to perform autonomous uplink transmission; and performing, by the user equipment, autonomous uplink transmission based on the first information and the second information.

In an implementable design, the receiving, by user equipment, first information sent by a network device includes: receiving, by the user equipment, the first information sent by the network device by using radio resource control signaling.

In an implementable design, the receiving, by the user equipment, second information sent by the network device includes: receiving, by the user equipment, downlink control information sent by the network device, where the downlink control information includes the second information; or receiving, by the user equipment, the second information sent by the network device by using a control unit at a media access control layer.

In an implementable design, the receiving, by the user equipment, downlink control information sent by the network device includes: descrambling, by the user equipment, a physical downlink control channel by using a specific radio network temporary identifier corresponding to autonomous uplink transmission, to obtain the downlink control information from the physical downlink control channel.

In an implementable design, the first information includes one or more of the following information: start position information, end position information, a resource period, an offset of a start position, a first resource size, and pattern information of a first bitmap.

In an implementable design, the second information includes one or more of the following information: activation position information, deactivation position information, a second resource size, and pattern information of a second bitmap.

According to a third aspect, an embodiment of this application provides a resource allocation apparatus, including: a first sending unit, configured to send first information to user equipment, where the first information is used to indicate uplink resources corresponding to autonomous uplink transmission performed by the user equipment; and a second sending unit, configured to send second information to the user equipment, where the second information is used to indicate a resource that is in the uplink resources and that is actually used by the user equipment to perform autonomous uplink transmission.

In an implementable design, the first sending unit is specifically configured to send the first information to the user equipment by adding the first information to radio resource control signaling.

In an implementable design, the second sending unit is specifically configured to send downlink control information to the user equipment, where the downlink control information includes the second information; or the second sending unit is specifically configured to send the second information to the user equipment by adding the second information to a control unit at a media access control layer.

In an implementable design, the second sending unit is specifically configured to: after scrambling the downlink control information by using a specific radio network temporary identifier corresponding to autonomous uplink transmission, send scrambled downlink control information to the user equipment.

In an implementable design, the first information includes one or more of the following information: start position information, end position information, a resource period, an offset of a start position, a first resource size, and pattern information of a first bitmap.

In an implementable design, the second information includes one or more of the following information: activation position information, deactivation position information, a second resource size, and pattern information of a second bitmap.

According to a fourth aspect, an embodiment of this application provides a resource allocation apparatus, including: a first receiving unit, configured to receive first information sent by a network device, where the first information is used to indicate uplink resources corresponding to autonomous uplink transmission performed by the user equipment; a second receiving unit, configured to receive second information sent by the network device, where the second information is used to indicate a resource that is in the uplink resources and that is actually used by the user equipment to perform autonomous uplink transmission; and an uplink transmission unit, configured to perform autonomous uplink transmission based on the first information and the second information.

In an implementable design, the first receiving unit is specifically configured to receive the first information sent by the network device by using radio resource control signaling.

In an implementable design, the second receiving unit is specifically configured to receive downlink control information sent by the network device, where the downlink control information includes the second information; or the second receiving unit is specifically configured to receive the second information sent by the network device by using a control unit at a media access control layer.

In an implementable design, the second receiving unit is specifically configured to descramble a physical downlink control channel by using a specific radio network temporary identifier corresponding to autonomous uplink transmission, to obtain the downlink control information from the physical downlink control channel.

In an implementable design, the first information includes one or more of the following information: start position information, end position information, a resource period, an offset of a start position, a first resource size, and pattern information of a first bitmap.

In an implementable design, the second information includes one or more of the following information: activation position information, deactivation position information, a second resource size, and pattern information of a second bitmap.

According to a fifth aspect, an embodiment of this application provides a communications system, including the resource allocation apparatus according to the third aspect and the resource allocation apparatus according to the fourth aspect.

According to a sixth aspect, an embodiment of this application provides a computer-readable storage medium, configured to store a computer instruction. When the computer instruction is run on a computer, the computer is enabled to perform the resource allocation method provided in the first aspect or the second aspect of the embodiments of this application.

According to a seventh aspect, an embodiment of this application provides a computer program product including an instruction. When the computer program product is run on a computer, the computer is enabled to perform the resource allocation method provided in the first aspect or the second aspect of the embodiments of this application.

According to the resource allocation method and apparatus, and the system provided in this application, the network device sends, to the user equipment, the first information used to indicate the uplink resources corresponding to autonomous uplink transmission performed by the user equipment; the network device sends, to the user equipment, the second information used to indicate the resource that is in the uplink resources and that is actually used by the user equipment to perform autonomous uplink transmission; and the user equipment performs autonomous uplink transmission based on the first information and the second information, so that the uplink resources corresponding to autonomous uplink transmission are allocated while resource utilization is ensured.

DESCRIPTION OF EMBODIMENTS

Figure 1:
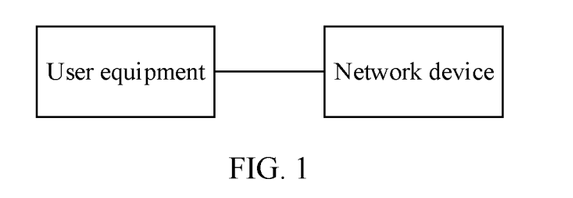
FIG. 1 is a schematic diagram of an application architecture according to an embodiment of this application.

A resource allocation method and a device provided in the embodiments of this application may be applied to a scenario of autonomous uplink transmission. Specifically, the method and the device may be applied to a scenario of autonomous uplink transmission in an LAA system. As shown in FIG. 1, an application architecture in an embodiment of this application may include user equipment (user equipment, UE) and a network device, and the user equipment is communicatively connected to the network device. The user equipment may send uplink data on an unlicensed spectrum based on an autonomous uplink transmission technology. The network device may allocate uplink resources used for autonomous uplink transmission to the user equipment.

The user equipment may include but is not limited to an internet device such as a smartphone (such as an Android mobile phone or an IOS mobile phone), a personal computer, a tablet computer, a palmtop computer, a mobile internet device (mobile internet devices, MID), or a wearable intelligent device.

The network device may include a base station. The base station may be a base transceiver station (base transceiver station, BTS) in a global system for mobile communications (global system for mobile communication, GSM) or a code division multiple access (code division multiple access, CDMA) system, or may be an NB (NodeB) in a wideband code division multiple access (wideband code division multiple access WCDMA) system, or may be an evolved NodeB (evolved NodeB, eNB) in LTE, or a relay station, or a vehicle-mounted device, a wearable device, an access network device in a future 5G network, an access network device in a future evolved public land mobile network (public land mobile network, PLMN) network, or the like. This is not limited in this application.

Specific embodiments are used below to describe in detail the technical solutions of this application. The following several specific embodiments may be combined with each other, and a same or similar concept or process may not be described repeatedly in some embodiments.

Figure 2:
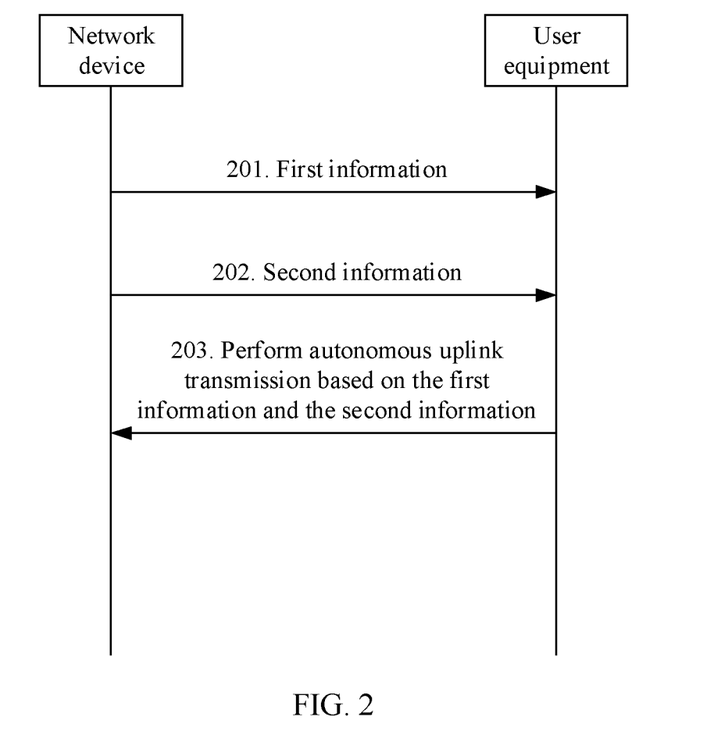
FIG. 2 is a flowchart of a resource allocation method according to an embodiment of this application.

FIG. 2 is a flowchart of a resource allocation method according to an embodiment of this application. As shown in FIG. 2, the method in this embodiment may include the following steps.

Step 201: A network device sends first information to user equipment, where the first information is used to indicate uplink resources corresponding to autonomous uplink transmission performed by the user equipment.

In this step, the network device may send the first information to the user equipment by using higher layer signaling, for example, radio resource control (radio resource control, RRC) signaling. The uplink resources that are indicated by the first information and that correspond to autonomous uplink transmission may be understood as uplink resources that the network device plans to allocate for autonomous uplink transmission. It should be noted that the uplink resources are only the uplink resources that the network device plans to allocate for autonomous uplink transmission, and after receiving the first information, the network device cannot directly use the uplink resources to perform autonomous uplink transmission.

The first information may specifically include any information that can indicate the uplink resources to the user equipment. Optionally, the first information may include one or more of the following information: start position information, end position information, a resource period, an offset of a start position, a first resource size, and pattern (pattern) information of a first bitmap (Bitmap). The start position information may indicate a start position of the uplink resources, and the end position information may indicate an end position of the uplink resources. The start position information and the end position information may be specifically described by using one or more of a radio frame number (also referred to as a system frame number), a subframe number, a slot number, a symbol index, and the like. The resource period may indicate a configuration period of the uplink resources. The offset of the start position may be used to correct the start position of the uplink resources. When the uplink resources are periodically configured, the first resource size may indicate a size of the uplink resources configured in each period. When the uplink resources are aperiodically configured, the first resource size may indicate a size of the configured uplink resources. The offset of the start position, the resource period, and the first resource size may be specifically described by using a time length value, a quantity of subframes, a quantity of radio frames, a quantity of slots, a quantity of symbols, or the like. The pattern information of the first bitmap may be used to indicate a bitmap pattern of the uplink resources. When the uplink resources are periodically configured, the pattern information of the first bitmap may indicate a bitmap pattern of an uplink resource configured in a single period. Bitmap patterns in different periods may be the same, or may be different. This is not limited herein. The first bitmap may be specifically measured in a subframe, a radio frame, a slot (slot), a symbol, or a smaller measurement unit. This is not limited herein. If the first bitmap is measured in a subframe, one bit of the first bitmap may correspond to one subframe. If the first bitmap is measured in a slot, one bit may correspond to one slot. In the pattern information of the first bitmap, a bit corresponding to a resource planned to allocate for autonomous uplink transmission and a bit corresponding to a resource planned not to allocate for autonomous uplink transmission are set to different values.

The following describes an example in which the first information indicates the uplink resources by using one or more of the foregoing information.

Example 1: The first information includes the start position information and the resource period. Correspondingly, the uplink resources that are indicated by the first information and that correspond to autonomous uplink transmission may be shown in FIG. 3A. A size of uplink resources in each period may be a preset size, and sizes of uplink resources in all periods may be the same or may be different. This is not limited in this application.

Example 2: The first information includes the start position information, the resource period, and the first resource size. Correspondingly, the uplink resources that are indicated by the first information and that correspond to autonomous uplink transmission may be shown in FIG. 3B.

Example 3: The first information includes the start position information, the resource period, the first resource size, and the offset of the start position. Correspondingly, the uplink resources that are indicated by the first information and that correspond to autonomous uplink transmission may be shown in FIG. 3C.

Example 4: The first information includes the start position information, the resource period, the first resource size, and the end position information. Correspondingly, the uplink resources that are indicated by the first information and that correspond to autonomous uplink transmission may be shown in FIG. 3D.

In Example 1 to Example 4, the uplink resources that are indicated by the first information and that correspond to autonomous uplink transmission may be understood as resources in a resource range limited by one or more of the start position information, the end position information, the resource period, the first resource size, and the offset of the start position.

Optionally, in addition to one or more of the start position information, the end position information, the resource period, the first resource size, and the offset of the start position, the first information may further include the pattern information of the first bitmap. Correspondingly, the uplink resources that are indicated by the first information and that correspond to autonomous uplink transmission may be understood as resources determined, with reference to the pattern information of the first bitmap, in the resource range limited by one or more of the start position information, the end position information, the resource period, the first resource size, and the offset of the start position. For details, refer to Example 5 to Example 7.

Figure 4:
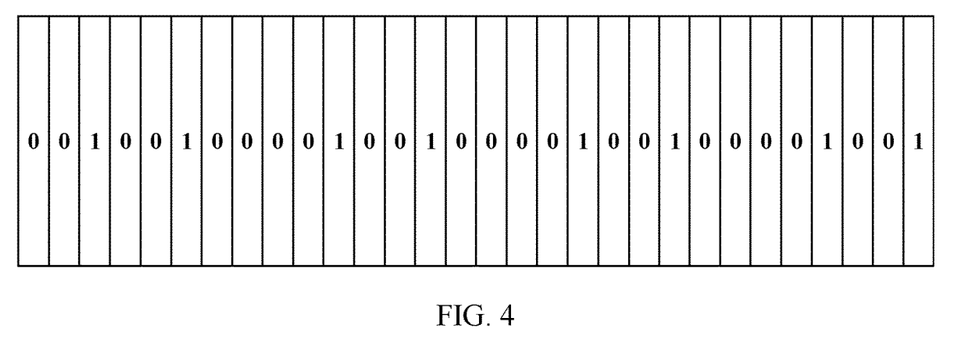
FIG. 4 is a schematic diagram of pattern information according to an embodiment of this application.

Example 5: The first information includes the start position information, the end position information, and the pattern information of the first bitmap. Correspondingly, the uplink resources that are indicated by the first information and that correspond to autonomous uplink transmission may be resources determined, with reference to the pattern information of the first bitmap, in a resource range limited by the start position information and the end position information. For example, when the start position information is specifically a subframe number 0 of a radio frame number 1, the end position information is specifically a subframe number 0 of a radio frame number 4, and the pattern information of the first bitmap is shown in FIG. 4, the uplink resources that are indicated by the first information and that correspond to autonomous uplink transmission are subframes numbered 2 and 5 of the radio frame numbered 1, subframes numbered 0, 3, and 8 of a radio frame numbered 2, and subframes numbered 1, 6, and 9 of a radio frame numbered 3.

Example 6: The first information includes the start position information, the pattern information of the first bitmap, and the resource period. Correspondingly, the uplink resources that are indicated by the first information and that correspond to autonomous uplink transmission may be resources determined, with reference to the pattern information of the first bitmap, in a resource range limited by the start position information and the resource period.

Example 7: The first information includes the start position information, the end position information, the pattern information of the first bitmap, the resource period, and the offset of the start position. Correspondingly, the uplink resources that are indicated by the first information and that correspond to autonomous uplink transmission may be resources determined, with reference to the pattern information of the first bitmap, in a resource range limited by the start position information, the end position information, the resource period, and the offset of the start position.

It should be noted that, when the first information includes only the pattern information of the first bitmap, the uplink resources that are indicated by the first information and that correspond to autonomous uplink transmission may be resources determined in a preset resource range with reference to the pattern information of the first bitmap.

Step 202: The network device sends second information to the user equipment, where the second information is used to indicate a resource that is in the uplink resources and that is actually used by the user equipment to perform autonomous uplink transmission.

In this step, the network device may indicate that some or all of the uplink resources are actually used by the user equipment to perform autonomous uplink transmission. Specifically, the network device may determine, based on the first information and a current load status, the resource that is in the uplink resources and that is actually used by the user equipment to perform autonomous uplink transmission. Optionally, when current downlink load is relatively heavy, and uplink load is relatively light, the network device may indicate that a small part of the uplink resources is actually used by the user equipment to perform autonomous uplink transmission, and the network device may allocate other resources in the uplink resources for downlink transmission. When current downlink load is relatively light, and uplink load is relatively heavy, the network device may indicate that a large part of the uplink resources is actually used by the user equipment to perform autonomous uplink transmission, and the network device may allocate other resources in the uplink resources for downlink transmission. When current uplink load is very heavy, the network device may indicate that all of the uplink resources are actually used by the user equipment to perform autonomous uplink transmission. It can be learned that resource utilization can be improved by sending the second information to the user equipment.

The second information may specifically include any information that can indicate a resource in the uplink resources to the user equipment. Optionally, the second information may include one or more of the following information: activation position information, deactivation position information, a second resource size, and pattern information of a second bitmap.

One or more of the activation position information, the deactivation position information, and the second resource size may be used to indicate an activation window. The activation position information may indicate a start position of the activation window, and the deactivation position information may indicate an end position of the activation window. The activation position information and the deactivation position information may be specifically described by using one or more of a radio frame number (also referred to as a system frame number), a subframe number, a slot number, a symbol index, and the like. The second resource size may indicate a size of the activation window. The second resource size may be specifically described by using a time length value, a quantity of subframes, a quantity of radio frames, a quantity of slots, a quantity of symbols, or the like. The pattern information of the second bitmap may be used to indicate a bitmap pattern of a resource in the activation window that is in the uplink resources and that is actually used by the user equipment to perform autonomous uplink transmission. The second bitmap may be specifically measured in a subframe, a radio frame, a slot, a symbol, or a smaller measurement unit. This is not limited herein. If the second bitmap is measured in a subframe, one bit of the second bitmap may correspond to one subframe. If the second bitmap is measured in a slot, one bit may correspond to one slot. In the pattern information of the second bitmap, a bit corresponding to the resource actually used by the user equipment to perform autonomous uplink transmission and a bit corresponding to a resource actually not used by the user equipment to perform autonomous uplink transmission are set to different values.

The following describes an example in which the second information indicates, by using one or more of the foregoing information, the resource that is in the uplink resources and that is actually used by the user equipment to perform autonomous uplink transmission.

Figure 3A:
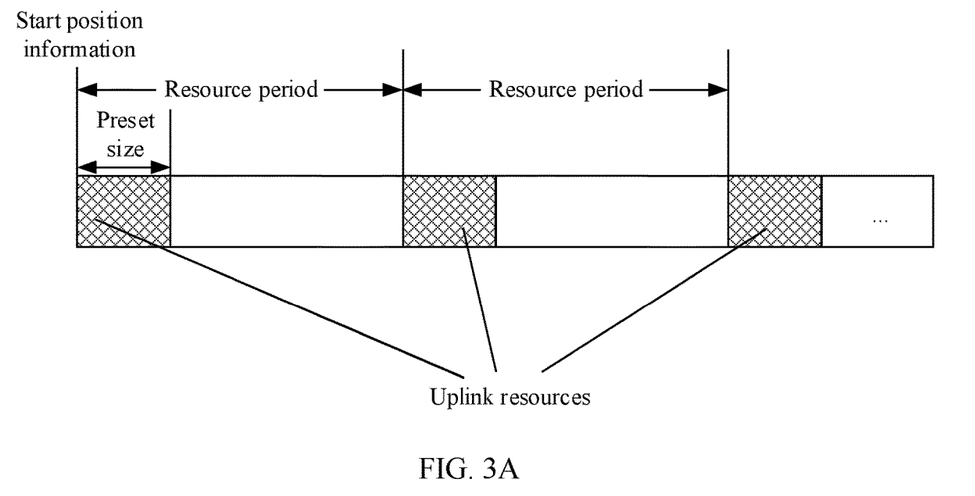
FIG. 3A is a schematic diagram 1 of uplink resources according to an embodiment of this application.
Figure 3B:
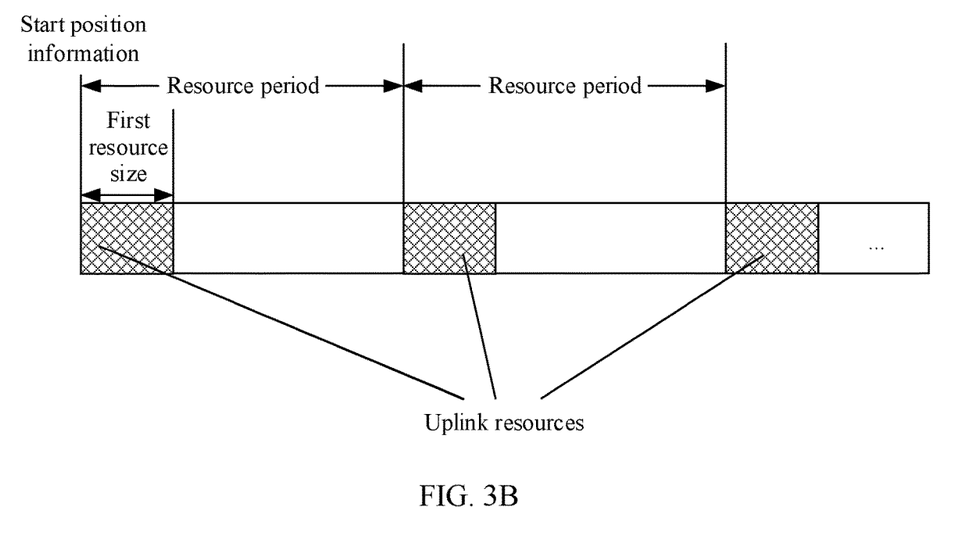
FIG. 3B is a schematic diagram 2 of uplink resources according to an embodiment of this application.
Figure 3C:
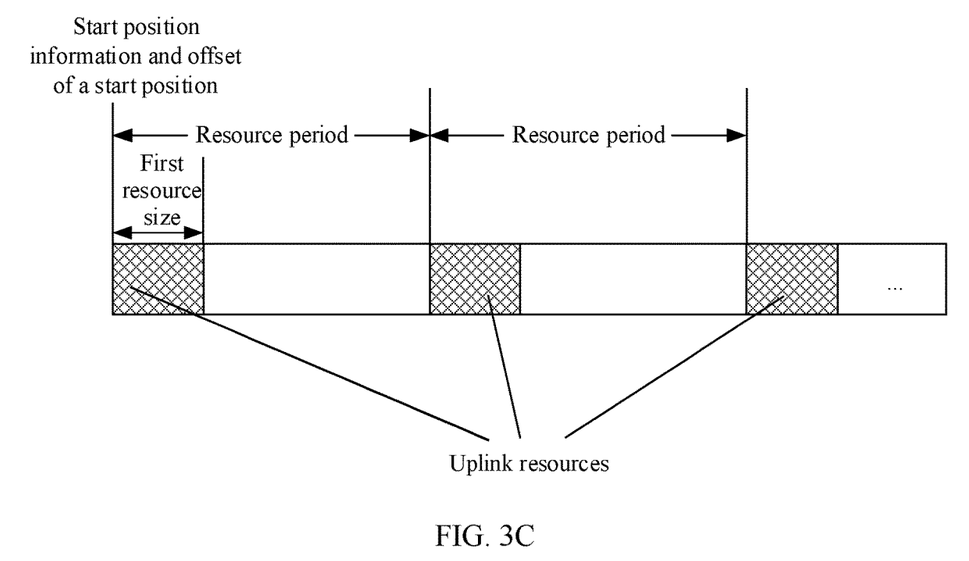
FIG. 3C is a schematic diagram 3 of uplink resources according to an embodiment of this application.
Figure 3D:
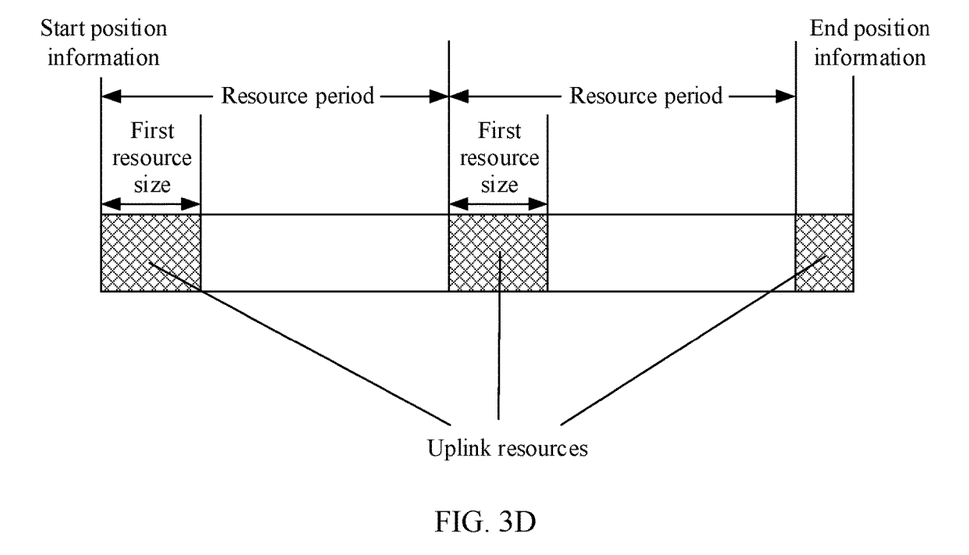
FIG. 3D is a schematic diagram 4 of uplink resources according to an embodiment of this application.
Figure 5A:
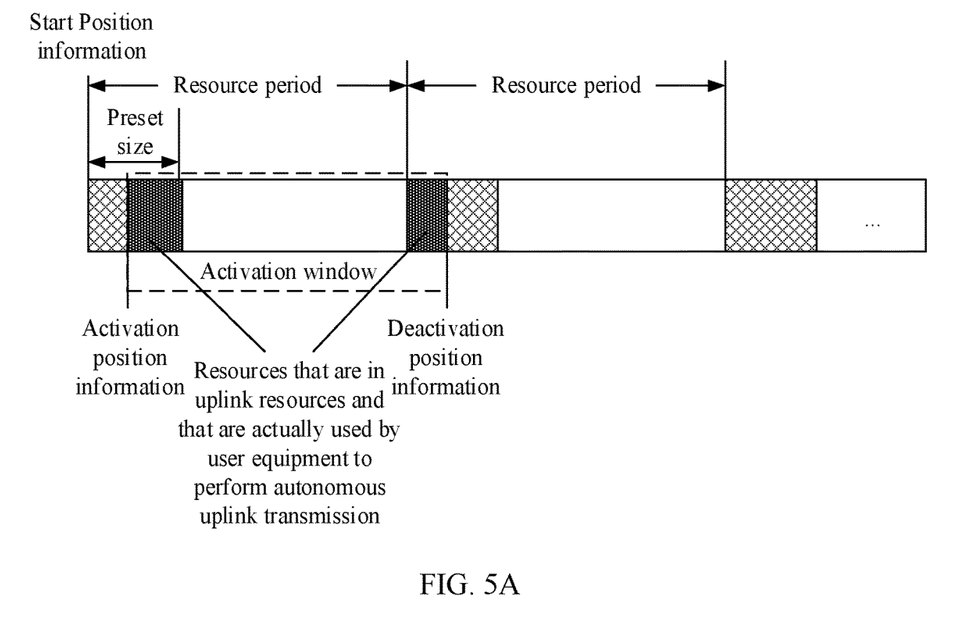
FIG. 5A is a schematic diagram 1 of a resource that is in uplink resources and that is actually used by user equipment to perform autonomous uplink transmission according to an embodiment of this application.

Example 8: The second information includes the activation position information and the deactivation position information. Specifically, the second information may limit the activation window by using the activation position information and the deactivation position information. The resource that is in the activation window and that is in the uplink resources is the resource that is actually used by the user equipment to perform autonomous uplink transmission. Assuming that the uplink resources that are indicated by the first information and that correspond to autonomous uplink transmission are shown in FIG. 3A, the resource that is indicated by the second information and that is actually used by the user equipment to perform autonomous uplink transmission may be specifically shown in FIG. 5A.

Figure 5B:
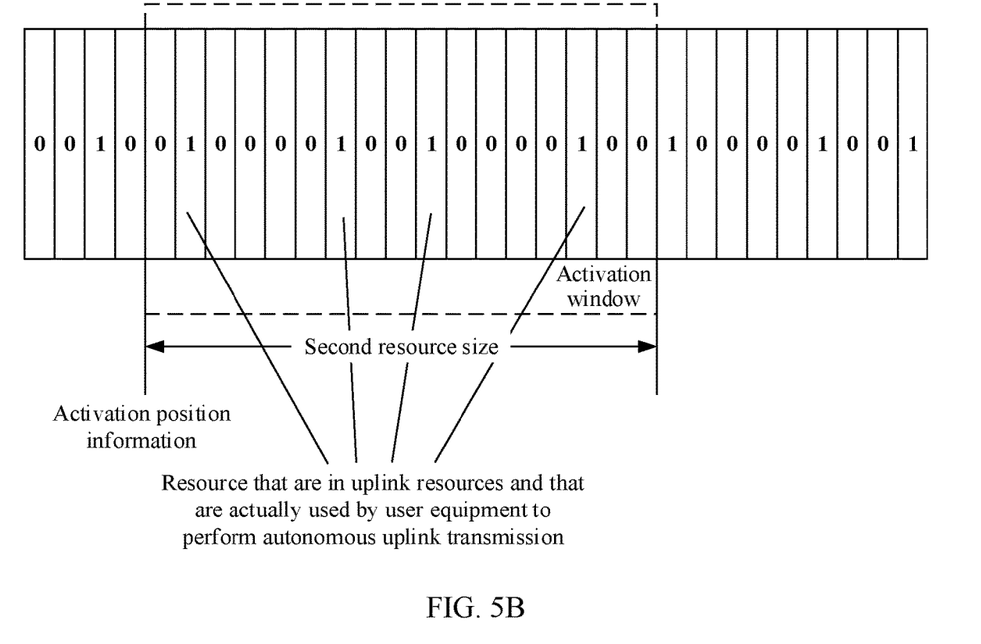
FIG. 5B is a schematic diagram 2 of a resource that is in uplink resources and that is actually used by user equipment to perform autonomous uplink transmission according to an embodiment of this application.

Example 9: The second information includes the activation position information and the second resource size. Specifically, the second information may limit the activation window by using the activation position information and the second resource size. The resource that is in the activation window and that is in the uplink resources is the resource that is actually used by the user equipment to perform autonomous uplink transmission. Assuming that the uplink resources that are indicated by the first information and that correspond to autonomous uplink transmission are shown in FIG. 4, the resource that is indicated by the second information and that is actually used by the user equipment to perform autonomous uplink transmission may be specifically shown in FIG. 5B.

Optionally, in addition to one or more of the activation position information, the deactivation position information, and the second resource size, the second information may further include the pattern information of the second bitmap. Correspondingly, the resource that is indicated by the second information and that is actually used by the user equipment to perform autonomous uplink transmission may be understood as a resource determined, with reference to the pattern information of the second bitmap, in uplink resources in the activation window limited by one or more of the activation position information, the deactivation position information, and the second resource size. For details, refer to Example 10 and Example 11.

Example 10: The second information includes the activation position information, the deactivation position information, and the pattern information of the second bitmap. Correspondingly, the resource that is indicated by the second information and that is actually used by the user equipment to perform autonomous uplink transmission may be understood as a resource determined, with reference to the pattern information of the second bitmap, in the uplink resources in the activation window limited by the activation position information and the deactivation position information.

Figure 5C:
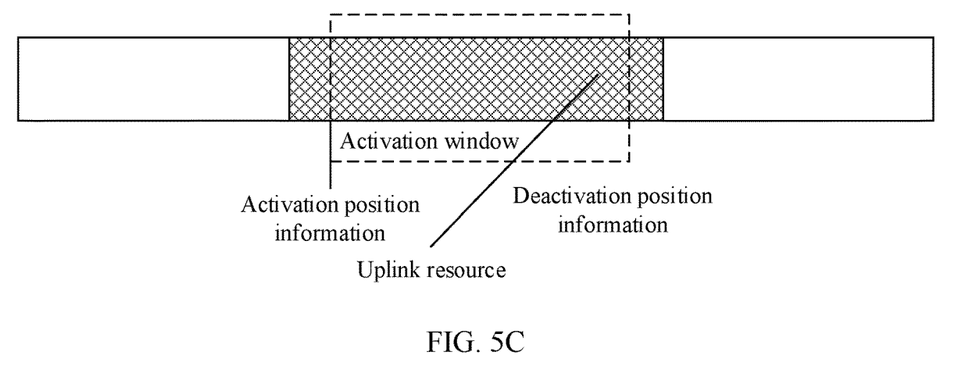
FIG. 5C is a schematic diagram of uplink resources and an activation window according to an embodiment of this application.

Example 11: The second information includes the activation position information, the second resource size, and the pattern information of the second bitmap. Correspondingly, the resource that is indicated by the second information and that is actually used by the user equipment to perform autonomous uplink transmission may be understood as a resource determined, with reference to the pattern information of the second bitmap, in the uplink resources in the activation window limited by the activation position information and the second resource size. It is assumed that the uplink resources that are indicated by the first information and that correspond to autonomous uplink transmission and the activation window indicated by the second information are shown in FIG. 5C. The activation position information is a subframe number 0 of a radio frame number 1, the second resource size is 30 subframes, and the bitmap information of the second bitmap is shown in FIG. 4. In the second bitmap, one bit corresponds to one subframe, a value of the bit corresponding to the resource actually used by the user equipment to perform autonomous uplink transmission is 1, and a value of the bit corresponding to the resource actually not used by the user equipment to perform autonomous uplink transmission is 0. Therefore, the second information may be specifically used to indicate that the resource actually used by the user equipment to perform autonomous uplink transmission is subframes numbered 2 and 5 of the radio frame numbered 1, subframes numbered 0, 3, and 8 of a radio frame numbered 2, and subframes numbered 1, 6, and 9 of a radio frame numbered 3.

It should be noted that, when the second information includes only the pattern information of the second bitmap, a range of the activation window may be considered as a range of the uplink resources that are indicated by the first information and that correspond to autonomous uplink transmission.

It should be noted that in this embodiment of this application, an example in which the uplink resources are time resources is mainly used for description. Optionally, the uplink resources may alternatively be frequency resources or time-frequency resources. This is not limited in this application. Specifically, when the uplink resources are the frequency resources, the start position information, the end position information, the activation position information, and the deactivation position information may be specifically described by using a subcarrier number that can be used to indicate a frequency resource unit, the resource period, the first resource size, the offset of the start position, and the second resource size may be specifically described by using a frequency bandwidth or a quantity of subcarriers that can be used to indicate a frequency resource size, and the first bitmap and the second bitmap may be specifically measured in a subcarrier. This is not limited in this application. When the uplink resources are the time-frequency resources, the start position information and the end position information may be specifically described by using a physical resource block (physical resource block, PRB) that can be used to indicate a time-frequency resource unit, the resource period, the first resource size, the offset of the start position may be specifically described by using a quantity of physical resource blocks that can be used to indicate a time-frequency resource size, and the first bitmap and the second bitmap may be specifically measured in a physical resource block. This is not limited in this application.

Optionally, the network device may send the second information to the user equipment by using lower layer signaling, for example, media access control (media access control, MAC) layer or physical layer signaling. Optionally, step 202 may be specifically that the network device sends downlink control information (downlink control information, DCI) to the user equipment, where the downlink control information includes the second information, or the network device sends the second information to the user equipment by adding the second information to a control unit (control element, CE) at a MAC layer. Optionally, a format (format) of the downlink control information may be a newly generated DCI format, or may be an existing DCI format OA or DCI format 4A. Further, optionally, before step 202, an existing field in the DCI format OA or the DCI format 4A may be further verified.

Specifically, verification may be performed on one or more of a TPC command for scheduled PUSCH (TPC command for scheduled PUSCH) field, a modulation and coding scheme and redundancy version (Modulation and coding scheme and redundancy version) field, a hybrid ARQ process number (HARQ process number) field, a modulation and coding scheme (Modulation and coding scheme) field, or a redundancy version (Redundancy version) field of the PUSCH.

It should be noted that a specific implementation of field verification is not limited in the embodiments of this application, and a person skilled in the art may perform a corresponding design based on an actual requirement.

Considering that the downlink control information received by the user equipment may include the second information for autonomous uplink transmission, or may include other dynamic scheduling information for normal uplink scheduling, to help the user equipment distinguish specific information included in downlink control information carried in a physical downlink control channel (physical downlink control channel, PDCCH), the user equipment may distinguish the downlink control information by using a cell radio network temporary identifier (radio network temporary identifier, RNTI). Specifically, when the downlink control information includes the second information, the network device adds the downlink control information to the physical downlink control channel, and sends the physical downlink control channel to the user equipment after scrambling the physical downlink control channel by using a specific radio network resource identifier corresponding to autonomous uplink transmission. The user equipment descrambles the physical downlink control channel by using the specific radio network resource identifier, to obtain the downlink control information from the physical downlink control channel. In addition, because the user equipment performs descrambling by using the specific radio network resource identifier corresponding to autonomous uplink transmission, it may be determined that the downlink control information includes the second information. When the downlink control information includes the dynamic scheduling information, the network device adds the downlink control information to the physical downlink control channel, and sends the physical downlink control channel to the user equipment after scrambling the physical downlink control channel by using a cell radio network temporary identifier (cell radio network temporary identifier, C-RNTI). The user equipment descrambles the physical downlink control channel by using the C-RNTI, to obtain the downlink control information from the physical downlink control channel. In addition, because the user equipment performs descrambling by using the C-RNTI, it may be determined that the downlink control information includes the dynamic scheduling information.

The specific radio network resource identifier corresponding to autonomous uplink transmission may be marked as an autonomous uplink radio network temporary identifier AUL-RNTI.

Step 203: The user equipment performs autonomous uplink transmission based on the first information and the second information.

In this step, when the user equipment has uplink data on which autonomous uplink transmission needs to be performed, the user equipment may obtain, by using the first information, all uplink resources indicated by the first information, then obtain, by receiving the second information, an activated uplink resource in the uplink resources indicated by the first information, and perform autonomous uplink transmission on the uplink resource in the activation window. Specifically, the uplink data may be transmitted on the uplink resource in the activation window by using an LBT contention access mechanism.

In this application, the network device sends, to the user equipment, the first information used to indicate the uplink resources corresponding to autonomous uplink transmission performed by the user equipment; the network device sends, to the user equipment, the second information used to indicate the resource that is in the uplink resources and that is actually used by the user equipment to perform autonomous uplink transmission; and the user equipment performs autonomous uplink transmission based on the first information and the second information, so that the uplink resources corresponding to autonomous uplink transmission are allocated while resource utilization is ensured.

Figure 6:
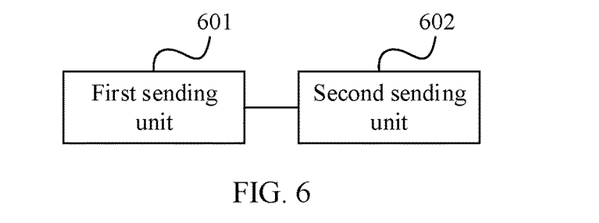
FIG. 6 is a schematic structural diagram of a resource allocation apparatus according to an embodiment of this application.

FIG. 6 is a schematic structural diagram of a resource allocation apparatus according to an embodiment of this application. As shown in FIG. 6, the resource allocation apparatus provided in this embodiment may include: a first sending unit 601, configured to send first information to user equipment, where the first information is used to indicate uplink resources corresponding to autonomous uplink transmission performed by the user equipment; and a second sending unit 602, configured to send second information to the user equipment, where the second information is used to indicate a resource that is in the uplink resources and that is actually used by the user equipment to perform autonomous uplink transmission.

Optionally, the first sending unit 601 is specifically configured to send the first information to the user equipment by adding the first information to radio resource control signaling.

Optionally, the second sending unit 602 is specifically configured to send downlink control information to the user equipment, where the downlink control information includes the second information; or the second sending unit 602 is specifically configured to send the second information to the user equipment by adding the second information to a control unit at a media access control layer.

Optionally, the second sending unit 602 is specifically configured to: after scrambling the downlink control information by using a specific radio network temporary identifier corresponding to autonomous uplink transmission, send scrambled downlink control information to the user equipment.

Optionally, the first information includes one or more of the following information:

start position information, end position information, a resource period, an offset of a start position, a first resource size, and pattern information of a first bitmap.

Optionally, the second information includes one or more of the following information:

activation position information, deactivation position information, a second resource size, and pattern information of a second bitmap.

The apparatus provided in this embodiment of this application may perform the technical solution on a network device side in the foregoing method embodiment, and implementation principles and technical effects thereof are similar. Details are not described herein.

Figure 7:
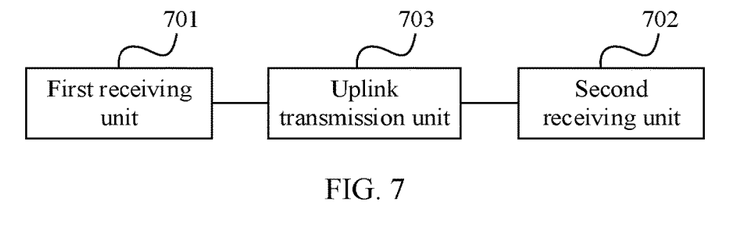
FIG. 7 is a schematic structural diagram of a resource allocation apparatus according to another embodiment of this application.

FIG. 7 is a schematic structural diagram of a resource allocation apparatus according to another embodiment of this application. As shown in FIG. 7, the resource allocation apparatus provided in this embodiment may include: a first receiving unit 701, configured to receive first information sent by a network device, where the first information is used to indicate uplink resources corresponding to autonomous uplink transmission performed by the user equipment; a second receiving unit 702, configured to receive second information sent by the network device, where the second information is used to indicate a resource that is in the uplink resources and that is actually used by the user equipment to perform autonomous uplink transmission; and an uplink transmission unit 703, configured to perform autonomous uplink transmission based on the first information and the second information.

Optionally, the first receiving unit 701 is specifically configured to receive the first information sent by the network device by using radio resource control signaling.

Optionally, the second receiving unit 702 is specifically configured to receive downlink control information sent by the network device, where the downlink control information includes the second information; or the second receiving unit 702 is specifically configured to receive the second information sent by the network device by using a control unit at a media access control layer.

Optionally, the second receiving unit 702 is specifically configured to descramble a physical downlink control channel by using a specific radio network temporary identifier corresponding to autonomous uplink transmission, to obtain the downlink control information from the physical downlink control channel.

Optionally, the first information includes one or more of the following information:

start position information, end position information, a resource period, an offset of a start position, a first resource size, and pattern information of a first bitmap.

Optionally, the second information includes one or more of the following information:

activation position information, deactivation position information, a second resource size, and pattern information of a second bitmap.

The apparatus provided in this embodiment of this application may perform the technical solution on a user equipment side in the foregoing method embodiment, and implementation principles and technical effects thereof are similar. Details are not described herein.

It should be noted that, it should be understood that, the division into the units of the apparatus is merely logical function division, and during actual implementation, all or some of the units may be integrated into a physical entity, or the units may be physically separate. In addition, all of the units may be implemented in a form of software invoked by a processing element or in a form of hardware. Alternatively, some of the units may be implemented in a form of software invoked by a processing element, and some of the units may be implemented in a form of hardware. For example, the receiving unit may be a processing element disposed separately, or may be integrated into a chip of the apparatus for implementation. In addition, the receiving unit may be stored in a memory of the apparatus in a form of a program, and invoked by a processing element of the apparatus to perform the function of the receiving unit. Implementations of the other units are similar thereto. In addition, some or all of these units may be integrated together, or may be implemented independently. The processing element may be an integrated circuit and has a signal processing capability. In an implementation process, steps in the foregoing methods or the foregoing units can be implemented by using a hardware integrated logic circuit in the processing element, or by using instructions in a form of software. In addition, the foregoing receiving unit is a receiving control unit, and may receive information by using a receiving apparatus of the apparatus, for example, an antenna or a radio frequency apparatus.

The foregoing units may be configured as one or more integrated circuits for implementing the foregoing method, for example, one or more application-specific integrated circuits (Application Specific Integrated Circuit, ASIC); or may be configured as one or more microprocessors (such as a digital signal processor DSP), one or more field programmable gate arrays (Field Programmable Gate Array, FPGA), or the like. For another example, when one of the foregoing units is implemented by a processing element by invoking a program, the processing element may be a general-purpose processor, for example, a central processing unit (Central Processing Unit, CPU) or another processor that can invoke the program. For another example, these units may be integrated together, and implemented in a form of a system-on-a-chip (system-on-a-chip, SOC).

An embodiment of this application further provides a communications system, including the resource allocation apparatus shown in FIG. 6 and the resource allocation apparatus shown in FIG. 7.

Figure 8:
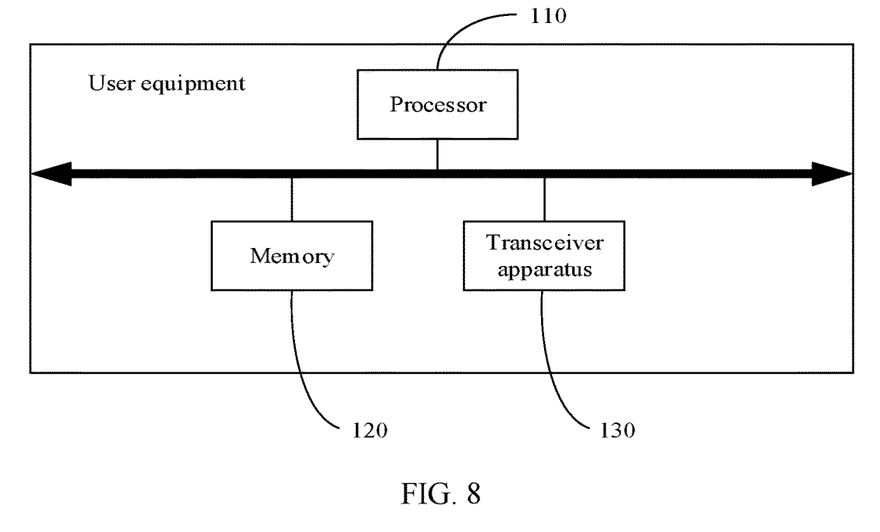
FIG. 8 is a schematic structural diagram of user equipment according to an embodiment of this application.

FIG. 8 is a schematic structural diagram of user equipment according to an embodiment of this application. As shown in FIG. 8, the user equipment includes a processor 110, a memory 120, and a transceiver apparatus 130. The transceiver apparatus 130 may be connected to an antenna. In a downlink direction, the transceiver apparatus 130 receives, by using the antenna, information sent by a network device, and sends the information to the processor 110 for processing. In an uplink direction, the processor 110 processes data of the user equipment, and sends processed data to the network device by using the transceiver apparatus 130.

The memory 120 is configured to store programs for implementing the foregoing method embodiment or the modules in the embodiment shown in FIG. 7, and the processor 110 invokes the programs to perform the operations in the foregoing method embodiment, to implement the modules shown in FIG. 7.

Alternatively, some or all of the foregoing modules may be implemented in a form of an integrated circuit that is embedded in a chip of the user equipment. In addition, the modules may be independently implemented, or may be integrated together. In other words, the foregoing units may be configured as one or more integrated circuits for implementing the foregoing method, for example, one or more application-specific integrated circuits (Application Specific Integrated Circuit, ASIC); or may be configured as one or more microprocessors (such as a digital signal processor DSP), one or more field programmable gate arrays (Field Programmable Gate Array, FPGA), or the like.

Figure 9:
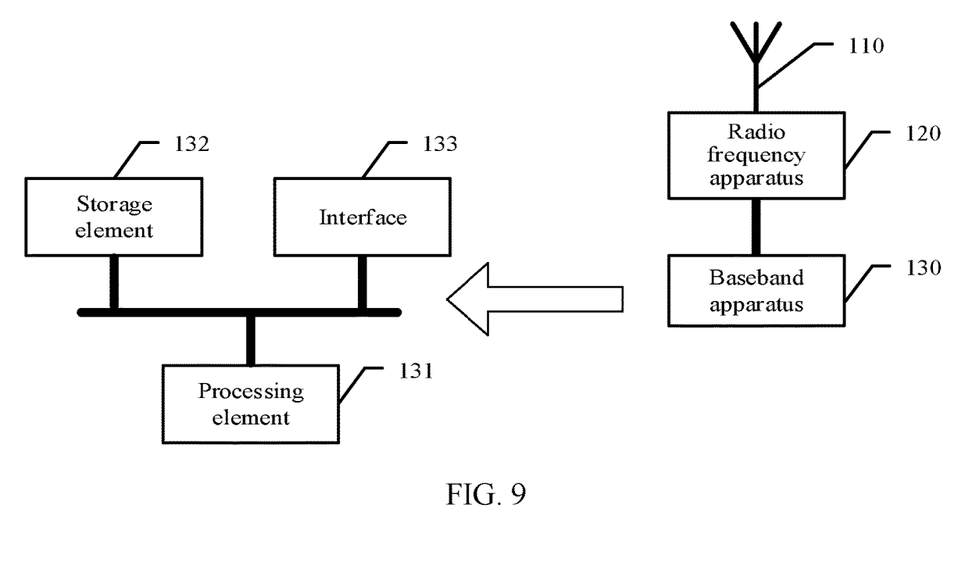
FIG. 9 is a schematic structural diagram of a network device according to an embodiment of this application.

FIG. 9 is a schematic structural diagram of a network device according to an embodiment of this application. As shown in FIG. 9, the network device includes an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by user equipment, and sends, to the baseband apparatus 130 for processing, the information sent by the user equipment. In a downlink direction, the baseband apparatus 130 processes the information sent by the user equipment, and sends processed information to the radio frequency apparatus 120. The radio frequency apparatus 120 processes the information sent by the user equipment, and then sends processed information to the user equipment by using the antenna 110.

In an implementation, the foregoing modules are implemented by a processing element by scheduling a program. For example, the baseband apparatus 130 includes a processing element 131 and a storage element 132, and the processing element 131 invokes a program stored in the storage element 132, to perform the method in the foregoing method embodiment. In addition, the baseband apparatus 130 may further include an interface 133, configured to exchange information with the radio frequency apparatus 120. For example, the interface is a common public radio interface (common public radio interface, CPRI).

In another implementation, the foregoing modules may be configured as one or more processing elements for implementing the foregoing method, and the processing elements are disposed on the baseband apparatus 130. The processing element herein may be an integrated circuit, for example, one or more ASICs, one or more DSPs, or one or more FPGAs. These integrated circuits may be integrated to form a chip.

For example, the foregoing modules may be integrated together, and implemented in a form of a system-on-a-chip (system-on-a-chip, SOC). For example, the baseband apparatus 130 includes a SOC chip, configured to implement the foregoing method. The processing element 131 and the storage element 132 may be integrated in the chip, and the foregoing method or the functions of the foregoing units may be implemented by the processing element 131 by invoking the program stored in the storage element 132. Alternatively, at least one integrated circuit may be integrated in the chip to implement the foregoing method or the functions of the foregoing units. Alternatively, the foregoing implementations may be combined, so that functions of some units are implemented by the processing element by invoking a program, and functions of some units are implemented by using an integrated circuit.

Regardless of a manner, the network device includes at least one processing element, a storage element, and a communications interface, and the at least one processing element is configured to perform the method provided in the foregoing method embodiment. The processing element may perform some or all of the steps in the foregoing method embodiment in a first manner, in other words, by executing the program stored in the storage element, or in a second manner, in other words, by using an integrated logic circuit of hardware in the processor element in combination with an instruction. Certainly, the method provided in the foregoing method embodiment may be alternatively performed by combining the first manner with the second manner.

The processing element herein is the same as that described in the foregoing, may be a general-purpose processor such as a central processing unit (Central Processing Unit, CPU); may be one or more integrated circuits configured to implement the foregoing method, for example, one or more application-specific integrated circuits (Application Specific Integrated Circuit, ASIC); or may be one or more microprocessors (such as a digital signal processor DSP), one or more field programmable gate arrays (Field Programmable Gate Array, FPGA) or the like.

The storage element may be a memory, or a general name of a plurality of storage elements.

An embodiment of this application further provides a storage medium, including a readable storage medium and a computer program, and the computer program is used to implement the resource allocation method provided by any one of the foregoing embodiments.

An embodiment of this application further provides a program product, the program product includes a computer program (namely, an executable instruction), and the computer program is stored in a readable storage medium. At least one processor of user equipment may read the computer program from the readable storage medium, and the at least one processor executes the computer program, so that the terminal implements the resource allocation method provided in the foregoing implementations.

An embodiment of this application further provides a resource allocation apparatus, including at least one storage element and at least one processing element. The at least one storage element is configured to store a program, and when the program is executed, the resource allocation apparatus is enabled to perform an operation of the network device in any one of the foregoing embodiments. The apparatus may be a network device chip.

An embodiment of this application further provides a storage medium, including a readable storage medium and a computer program, and the computer program is used to implement the resource allocation method provided by any one of the foregoing embodiments.

An embodiment of this application further provides a program product, the program product includes a computer program (namely, an executable instruction), and the computer program is stored in a readable storage medium. At least one processor of a network device may read the computer program from the readable storage medium, and the at least one processor executes the computer program, so that the network device implements the resource allocation method provided in the foregoing implementations.

An embodiment of this application further provides a resource allocation apparatus, including at least one storage element and at least one processing element. The at least one storage element is configured to store a program, and when the program is executed, the resource allocation apparatus is enabled to perform an operation of the network device in any one of the foregoing embodiments. The apparatus may be a network device chip.

All or some of the steps of the foregoing method embodiment may be implemented by a program instructing related hardware. The foregoing program may be stored in a computer-readable memory. When the program is executed, the steps of the methods in the embodiments are performed. The memory (storage medium) includes a read-only memory (English: read-only memory, ROM for short), a RAM, a flash memory, a hard disk, a solid state disk, a magnetic tape (English: magnetic tape), a floppy disk (English: floppy disk), an optical disc (English: optical disc), and any combination thereof.

What is claimed is:

1. A method, comprising:
    sending first information to a user equipment, wherein the first information indicates uplink resources corresponding to autonomous uplink transmission performed by the user equipment, and wherein the first information comprises pattern information of a bitmap and at least one of start position information, end position information, a resource period, an offset of a start position, or a first resource size;
    detecting a current uplink load and a current downlink load;
    allocating, based on the current uplink load and the current downlink load, a part of the uplink resources to the user equipment to perform the autonomous uplink transmission, wherein the part is less than all of the uplink resources indicated by the first information; and
    sending, in response to allocating the part of the uplink resources to the user equipment, second information to the user equipment, wherein the second information indicates the part of the uplink resources.

2. The method of claim 1, wherein the second information comprises at least one of activation position information, deactivation position information, or a second resource size.

3. The method of claim 2, wherein the second information further comprises pattern information of a second bitmap.

4. The method of claim 1, further comprising further sending the first information in Radio Resource Control (RRC) signaling.

5. The method of claim 1, further comprising further sending the second information in downlink control information.

6. The method of claim 5, further comprising:
    scrambling the downlink control information using a radio network temporary identifier corresponding to the autonomous uplink transmission; and
    further sending, after the scrambling, the second information.

7. The method of claim 1, further comprising adding the second information to a control circuit at a media access control layer to send the second information to the user equipment.

8. A method, comprising:
    receiving first information from a network device, wherein the first information indicates uplink resources corresponding to autonomous uplink transmission performed by a user equipment, and wherein the first information comprises pattern information of a bitmap and at least one of start position information, end position information, a resource period, an offset of a start position, or a first resource size;
    receiving second information from the network device, wherein the second information indicates a part of the uplink resources for the user equipment to perform the autonomous uplink transmission, and wherein the part is based on a current uplink load and a current downlink load and is less than all of the uplink resources indicated by the first information; and
    performing, after receiving the second information from the network device, the autonomous uplink transmission based on the first information and the second information.

9. The method of claim 8, wherein the second information comprises at least one of activation position information, deactivation position information, or a second resource size.

10. The method of claim 9, wherein the second information further comprises pattern information of a second bitmap.

11. The method of claim 8, further comprising further receiving the first information in Radio Resource Control (RRC) signaling.

12. The method of claim 8, further comprising further receiving the second information in downlink control information.

13. The method of claim 12, further comprising descrambling a physical downlink control channel using a radio network temporary identifier corresponding to the autonomous uplink transmission to obtain the downlink control information from the physical downlink control channel.

14. The method of claim 8, further comprising further receiving the second information from the network device using a control circuit at a media access control layer.

15. A apparatus, comprising:
    a memory configured to store instructions; and
    one or more processors coupled to the memory and configured to execute the instructions to:
        send first information to a user equipment, wherein the first information indicates uplink resources corresponding to autonomous uplink transmission performed by the user equipment, and wherein the first information comprises pattern information of a bitmap and at least one of start position information, end position information, a resource period, an offset of a start position, or a first resource size;
        detect a current uplink load and a current downlink load;
        allocate, based on the current uplink load and the current downlink load, a part of the uplink resources to the user equipment to perform the autonomous uplink transmission, wherein the part is less than all of the uplink resources indicated by the first information; and
        send, in response to allocating the part of the uplink resources to the user equipment, second information to the user equipment, wherein the second information indicates the part of the uplink resources.

16. The apparatus of claim 15, wherein the second information comprises at least one of activation position information, deactivation position information, or a second resource size.

17. The apparatus of claim 15, wherein the instructions further cause the apparatus to further send the first information in Radio Resource Control (RRC) signaling.

18. The apparatus of claim 15, wherein the instructions further cause the apparatus to send downlink control information to the user equipment, and wherein the downlink control information comprises the second information.

19. The apparatus of claim 18, wherein the instructions further cause the apparatus to:

scramble the downlink control information using a radio network temporary identifier corresponding to the autonomous uplink transmission; and further send, after the scrambling, the downlink control information to the user equipment.

20. The apparatus of claim 15, wherein the second information further comprises pattern information of a second bitmap.

21. The apparatus of claim 15, wherein the instructions further cause the apparatus to add the second information to a control circuit at a media access control layer to send the second information to the user equipment.

22. An apparatus, comprising:
a memory configured to store instructions; and
one or more processors coupled to the memory and configured to execute the instructions to:
receive first information from a network device, wherein the first information indicates uplink resources corresponding to autonomous uplink transmission performed by a user equipment, and wherein the first information comprises pattern information of a bitmap and at least one of start position information, end position information, a resource period, an offset of a start position, or a first resource size;
receive second information from the network device, wherein the second information indicates a part of the uplink resources for the user equipment to perform the autonomous uplink transmission, and wherein the part is based on a current uplink load and a current downlink load and is less than all of the uplink resources indicated by the first information; and
perform, after receiving the second information from the network device, perform the autonomous uplink transmission based on the first information and the second information.

23. The apparatus of claim 22, wherein the second information comprises at least one of activation position information, deactivation position information, or a second resource size.

24. The apparatus of claim 22, wherein the instructions further cause the apparatus to further receive the first information in radio resource control Radio Resource Control (RRC) signaling.

25. The apparatus of claim 22, wherein the instructions further cause the apparatus to receive downlink control information from the network device, and wherein the downlink control information comprises the second information.

26. The apparatus of claim 25, wherein the instructions further cause the apparatus to descramble a physical downlink control channel using a radio network temporary identifier corresponding to the autonomous uplink transmission to obtain the downlink control information from the physical downlink control channel.

27. The apparatus of claim 22, wherein the second information further comprises pattern information of a second bitmap.

28. The apparatus of claim 22, wherein the instructions further cause the apparatus to receive the second information from the network device using a control circuit at a media access control layer.

* * * * *